HELICAL TAPE SCANNER

Filed July 29, 1966

Roy C. Wilcox
Furman D. Kell,
INVENTORS.

Harry M. Saragovitz
BY Edward J. Kelly
Herbert Berl
James T. Deaton

United States Patent Office 3,428,524

Patented Feb. 18, 1969

3,428,524

HELICAL TAPE SCANNER

Roy C. Wilcox, Seattle, Wash., and Furman D. Kell, Cherry Hill, N.J., assignors, by mesne assignments, to the United States of America as represented by the Secretary of the Army Filed July 29, 1966, Ser. No. 568,991

U.S. Cl. 179—100.2 1 Claim

Int. Cl. G11b *5/00;* B65h *23/00*

ABSTRACT OF THE DISCLOSURE

A helical tape scanner having a diagonally mounted mandrel with a recessed portion 380° thereabout for guiding a magnetic tape through and over a magnetic head positioned within the mandrel. Air-lubrication is supplied through spaced ports within the recessed portion from a regulated air supply.

This invention relates to a helical tape scanner that is used to record, store and playback mechanically a substantial amount of information at video frequencies with a minimum of magnetic heads and electronic equipment.

In radar data processing for missile systems, there is a need for a tape scanner device that will handle a substantial amount of information at video frequencies with a minimum of electronic equipment.

Therefore, it is an object of this invention to provide a helical tape scanner that enables an increased amount of information at video frequencies to be recorded and played back with a minimum of magnetic heads and electronic equipment.

Another object of this invention is to provide a scanner device that positively guides magnetic tape in a helical path on the axis of a rotating magnetic head and thereby presents a continuous strip of magnetic tape for recording or playback.

Still another object of this invention is to provide a technique for permitting continuous recording of a single information channel with a single magnetic head.

A further object of this invention is to provide a helical tape scanner that can be advantageously applied to any high frequency, large-storage-capacity recorder, whether single or multi-channels.

A still further object of this invention is to provide a helical tape scanner in which the tape is air-lubricated as it passes about the scanner.

In accordance with this invention, a helical tape scanner is provided in which tape is positively guided in a helical path about the periphery of a hollow, two piece stationary mandrel that is inclined at the helix angle so that tape reels can be mounted parallel to a common panel. A head wheel is rotatably mounted between the two pieces of the stationary mandrel and has a video head thereon. Air is supplied through holes in the helical path about the mandrel to air-lubricate the tape, and air guides are provided for aiding in guiding the tape about the mandrel.

This invention may be better understood by referring to the drawing forming part of this specification, and in which like numerals are employed to designate corresponding parts throughout the same, and wherein.

Figure 1:
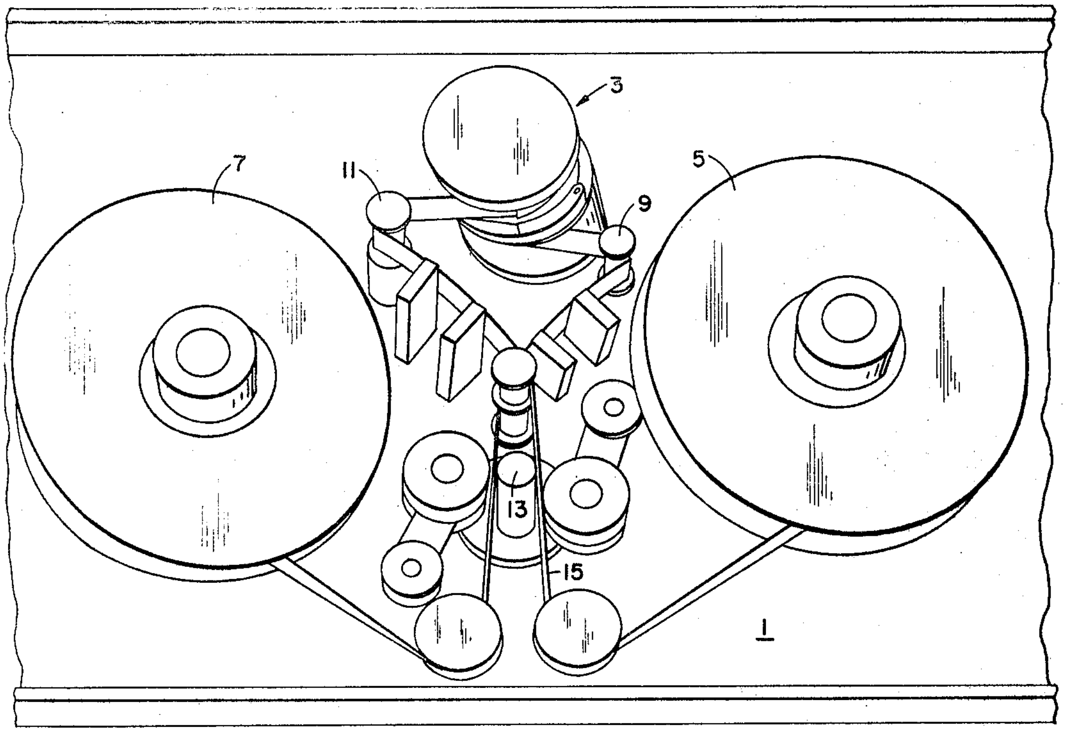
FIGURE 1 is a perspective view of recording equipment according to this invention.

The invention may be better understood by referring to the drawing wherein, numeral 1 designates a base on which helical mandrel 3 is mounted at an inclined helix angle so that tape reels 5 and 7 can be mounted parallel to the base. Air lubrication tape guides 9 and 11 are mounted on opposite sides of mandrel 3, and capstan 13 controls the speed of tape 15. Other various air guides, rollers and longitudinal recording heads normally associated with video recording equipment may be used in co-operation with the tape.

Figure 2:
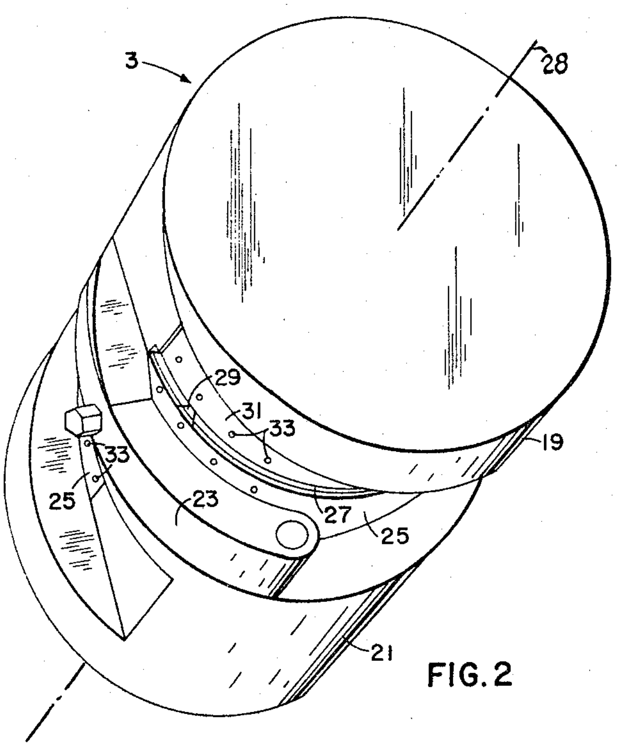
FIGURE 2 is a perspective view of helical mandrel according to this invention.

Referring to FIGURE 2, helical mandrel 3 is made of two stationary mechanically-coupled mandrel portions 19 and 21 that are mechanically coupled by member 23 and conventional securing means. Mandrel portions 19 and 21 have machined out helical groove 25 that extends 380 degrees about the mandrel for positively guiding tape 15 about the mandrel. This 380 degree feature, also, insures contact between rotatably mounted headwheel 27 and the magnetic tape in the area on the mandrel where the opposite tape edges meet. Headwheel 27 has a video head 29 thereon for co-operation in a conventional manner with the tape, and headwheel 27 is rotated by conventional driving means about an axis that is coaxial, or common with the axis of the mandrel and along center line 28.

Base 31 of helical groove 25 has a plurality of spaced ports 33 therein for receiving air under pressure to air-lubricate the tape as it passes around the helical groove. The air film which is established between the tape and the base of the helical groove permits almost frictionless passage of the tape around the groove and, in addition, provides a unique means for precise control of the diameter of the tape cylinder through regulation of the air supply pressure. In turn, the air supply pressure determines the thickness of the air film. This technique is used to insure adequate head to tape contact during the recording cycle and to eliminate contact during the rewind cycle.

Figure 3:
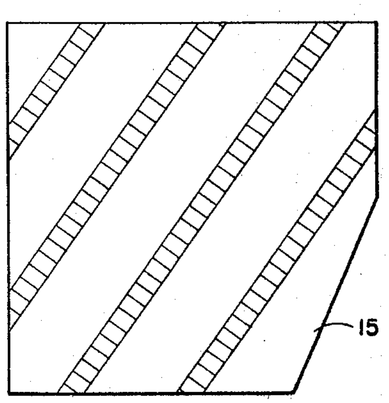
FIGURE 3 is a perspective view illustrating the typical flux pattern imparted to a tape portion.

In operation during recording, tape 15 is propelled by capstan 13 at a constant speed (15 in./sec.) and is removed from reel 7 and taken up by reel 5. As tape 15 passes around helical mandrel 3, it is scanned diagonally by video head 29 at a high velocity (1500 in./sec.). The incoming video information is normally transferred to a FM carrier which is used to electrically drive the coil in video head 29. This information is, thus, magnetically stored on the tape in a series of magnetic flux patterns as illustrated in FIGURE 3.

When read-out or playback of the stored information is desired, the tape is rewound to reel 7 and the machine is placed in the playback mode. Capstan 13 acts to align the diagonal flux patterns on the tape with the dynamic scanning path of the video head. The flux change created in the head through scanning of the previously recorded flux patterns results in the generation of a E.M.F. in the head coil. This signal, when amplified and processed through appropriate electronics, is an accurate reproduction of the original input signal.

What is claimed is:

1. A helical tape scanner including: a mandrel; a recessed helical groove formed in said mandrel for positively guiding a magnetic tape about said mandrel, said mandrel consisting of two mandrel portions that are secured together in spaced apart relation with the helical groove being formed substantially equally in each of said mandrel portions, said helical groove having ports in its base that are supplied with air under pressure to air-lubricate the tape as it passes around said mandrel; a headwheel rotatably mounted intermediate the ends of the two mandrel portions, and on an axis that is common with the axis of said mandrel, said headwheel having a video head thereon for diagonally scanning the magnetic tape as the magnetic tape passes about said helical groove, and wherein said helical groove extends substantially 380 degrees about said mandrel to insure contact between the headwheel and the magnetic tape in the area of the helical groove where the opposite tape edges meet.

References Cited

UNITED STATES PATENTS

| | | |
|---|---|---|
| 3,363,065 | 1/1968 | Tanigawa. |
| 3,293,377 | 12/1966 | Backers et al. |
| 3,317,680 | 5/1967 | Porter. |
| 3,319,014 | 5/1967 | Sugawa. |

FOREIGN PATENTS

| | | |
|---|---|---|
| 1,265,219 | 5/1961 | France. |
| 964,198 | 7/1964 | Great Britain. |
| 1,007,311 | 10/1965 | Great Britain. |

ANDRES H. NIELSEN, *Primary Examiner.*

U.S. Cl. X.R.

226—196